United States Patent [19]

Lin

[11] Patent Number: 5,626,060
[45] Date of Patent: May 6, 1997

[54] BICYCLE BOTTOM BRACKET AND BEARING AXLE ARRANGEMENT

[76] Inventor: Wen-Hwa Lin, No. 812, Chan Shen Rd., Tiah Shen Tsun, Wei Pu Hsiang, Taichung Hsien, Taiwan

[21] Appl. No.: 670,444

[22] Filed: Jun. 26, 1996

[51] Int. Cl.⁶ .................... G05G 1/14; F16C 13/08
[52] U.S. Cl. .................... 74/594.1; 384/458; 384/515; 384/545; 384/431
[58] Field of Search .................... 74/594.1, 594.2; 384/458, 513, 515, 540, 545, 431, 512

[56] References Cited

U.S. PATENT DOCUMENTS

| | | | |
|---|---|---|---|
| 3,578,829 | 5/1971 | Hata | 74/594.1 X |
| 3,893,708 | 7/1975 | Moroney | 74/594.1 X |
| 3,919,898 | 11/1975 | Sugino | 74/594.2 |
| 4,052,912 | 10/1977 | Vukelic | 74/594.1 |
| 4,531,756 | 7/1985 | Mori | 384/517 X |
| 4,763,957 | 8/1988 | Poehlmann et al. | 384/474 X |
| 5,118,205 | 6/1992 | Hoffmann | 384/458 |
| 5,209,581 | 5/1993 | Nagano | 384/545 |
| 5,233,885 | 8/1993 | Lin et al. | 74/594.1 |
| 5,243,879 | 9/1993 | Nagano | 74/594.2 |
| 5,496,114 | 3/1996 | Lin | 384/458 |

*Primary Examiner*—Vinh T. Luong
*Attorney, Agent, or Firm*—Varndell Legal Group

[57] ABSTRACT

A bicycle bottom bracket and bearing axle arrangement including two end caps fastened to the bottom bracket of a bicycle at two oppoisite sides to hold a bushing around the bottom bracket bearing axle, two nuts and two clamps respectively fastened tot he bottom bracket bearing axle to hold two axle bearings at two opposite ends of the bushing around the bottom bracket bearing axle, and a cushion mounted around the bottom bracket bearing axle between one nut and one clamp had having inward teeth respectively engaging in respective longitudinal sliding grooves on the bottom bracket bearing axle.

1 Claim, 4 Drawing Sheets

5,626,060

BICYCLE BOTTOM BRACKET AND BEARING AXLE ARRANGEMENT

BACKGROUND AND SUMMARY OF THE INVENTION

The present invention relates to the arrangement of the bottom bracket and the bottom bracket bearing axle of a bicycle, which uses two socket-like axle bearings to support the revolution of the bottom bracket bearing axle.

The chain drive of a bicycle is generally comprised of a bottom bracket bearing axle mounted in the bottom bracket, two pedals respectively coupled to two opposite ends of the bottom bracket bearing axle by a respective crank, a chain wheel fixedly mounted around the bottom bracket bearing axle and coupled to the rear sprocket by a chain. FIGS. 1 and 2 show the arrangement of the bottom bracket bearing axle in the bottom bracket according to the prior art. This arrangement comprises two externally threaded end caps respectively threaded into two inner threads in the bottom bracket at two opposite sides, a bushing and a ball bearing respectively mounted inside the bottom bracket around the bottom bracket bearing axle to support the revolution of the bottom bracket bearing axle. This arrangement has drawbacks. When in use, the ball bearing tends to be forced to displace. Another drawback of this arrangement is its shot service lift. Because the contact between the bottom bracket bearing axle and the balls of the ball bearing are limited to spots, less bearing surface is provided to support the revolution of the bottom bracket bearing axle. Furthermore, the ball bearing must the lubricated with a lubricating grease before its installation.

The present invention has been accomplished to provide a bicycle bottom bracket and bearing axle arrangement which eliminates the aforesaid drawbacks. According to the present invention, two nuts and two clamps respectively fastened to the bottom bracket bearing axle to hold two socket-like axle bearings at two opposite ends of the bushing around the bottom bracket bearing axle, and a cushion mounted around the bottom bracket bearing axle between one nut and one clamp and having inward teeth respectively engaging in respective longitudinal sliding grooves the bottom bracket bearing axle. The socket-like axle bearings are respectively made from oil modified resin, therefore no lubrication is needed. Because the inside wall of each socket-like axle bearing is disposed in contact with the periphery of the bottom bracket axle bearing, the broad contact area between the socket-like axle bearings and the bottom bracket bearing axle smoothly supports the revolution of the bottom bracket bearing axle.

DETAILED DESCRIPTION OF THE PREFERRED EMBODIMENT

Figure 1:
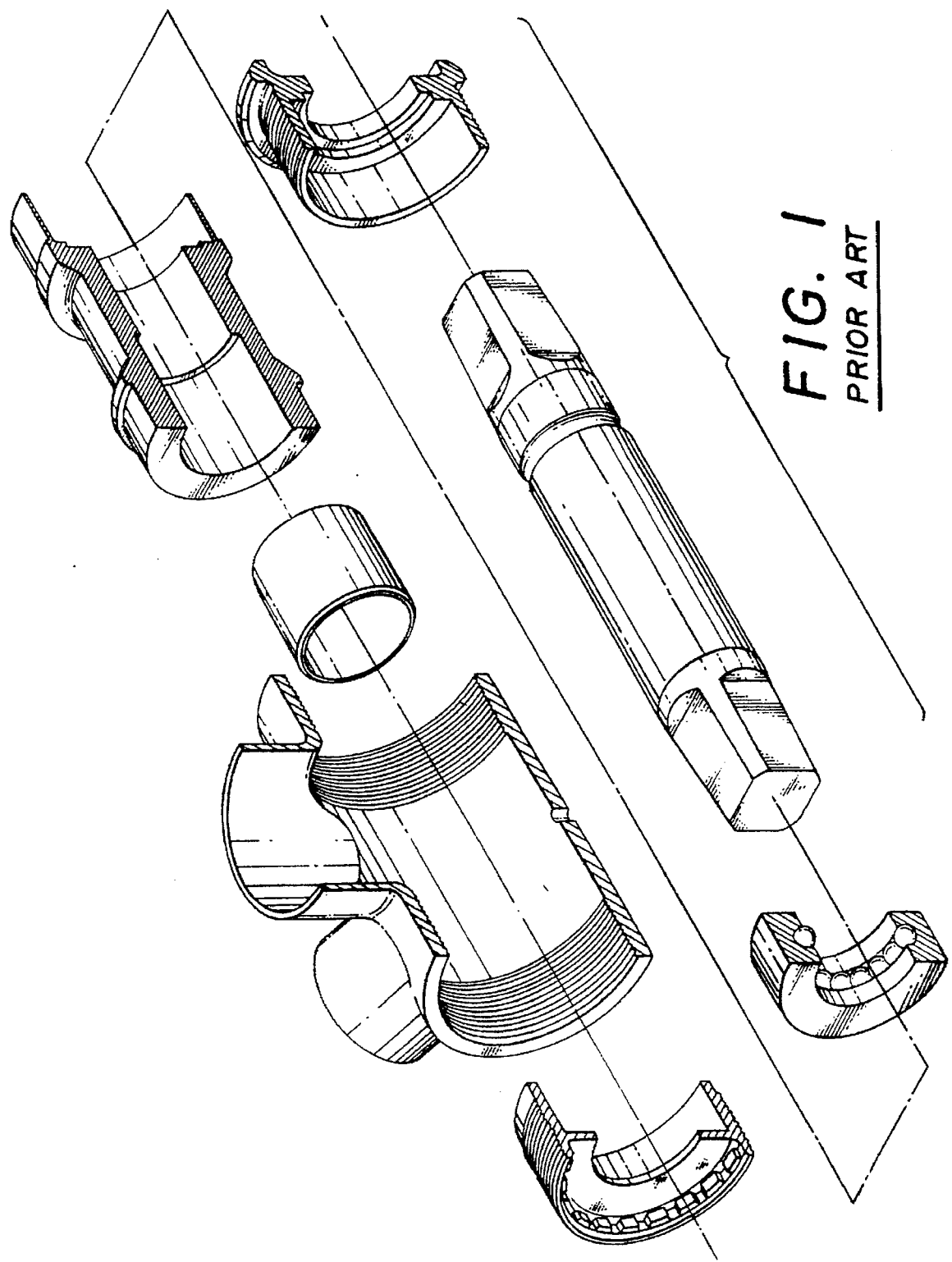
FIG. 1 is an exploded view of a bicycle bottom bracket and bearing axle arrangement according to the prior art.
Figure 2:
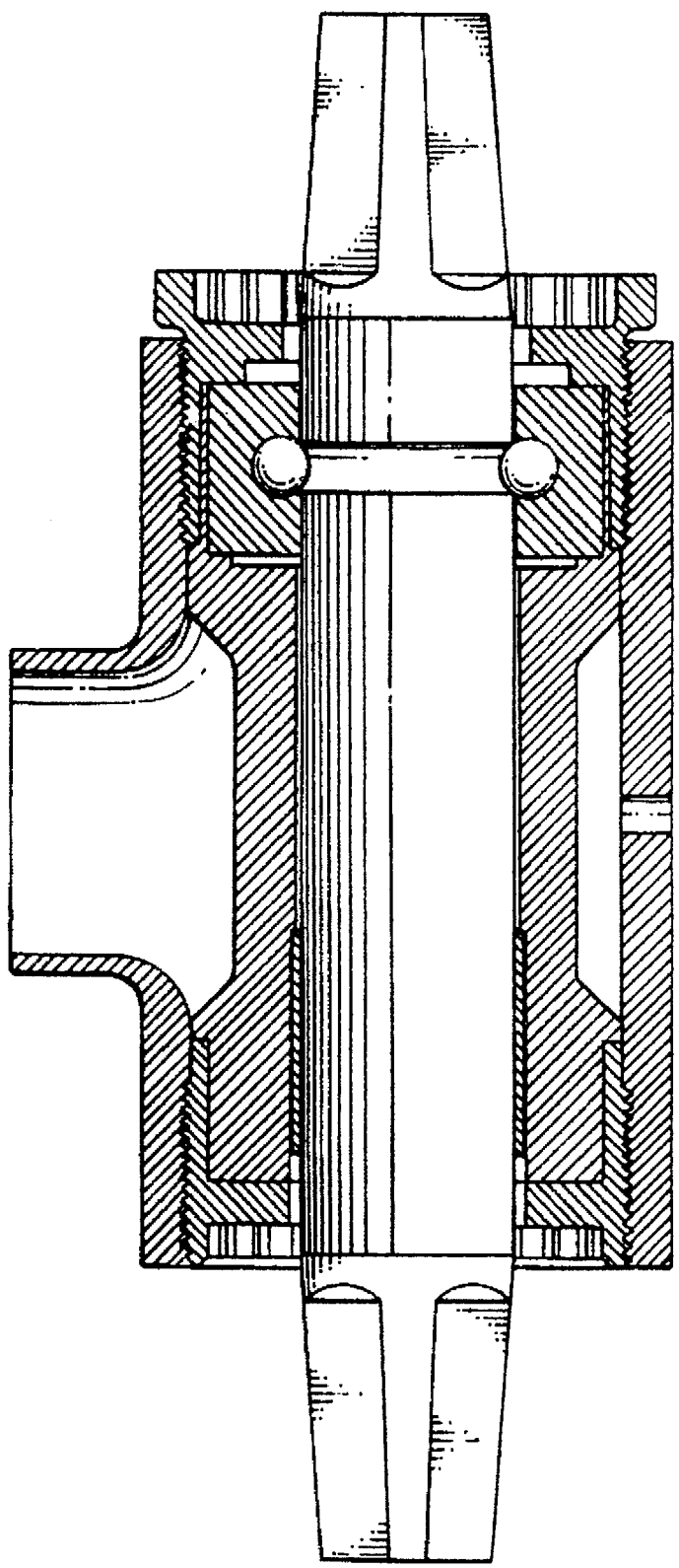
FIG. 2 is a sectional assembly view of the bicycle bottom bracket and bearing axle arrangement shown in FIG. 1.
Figure 3:
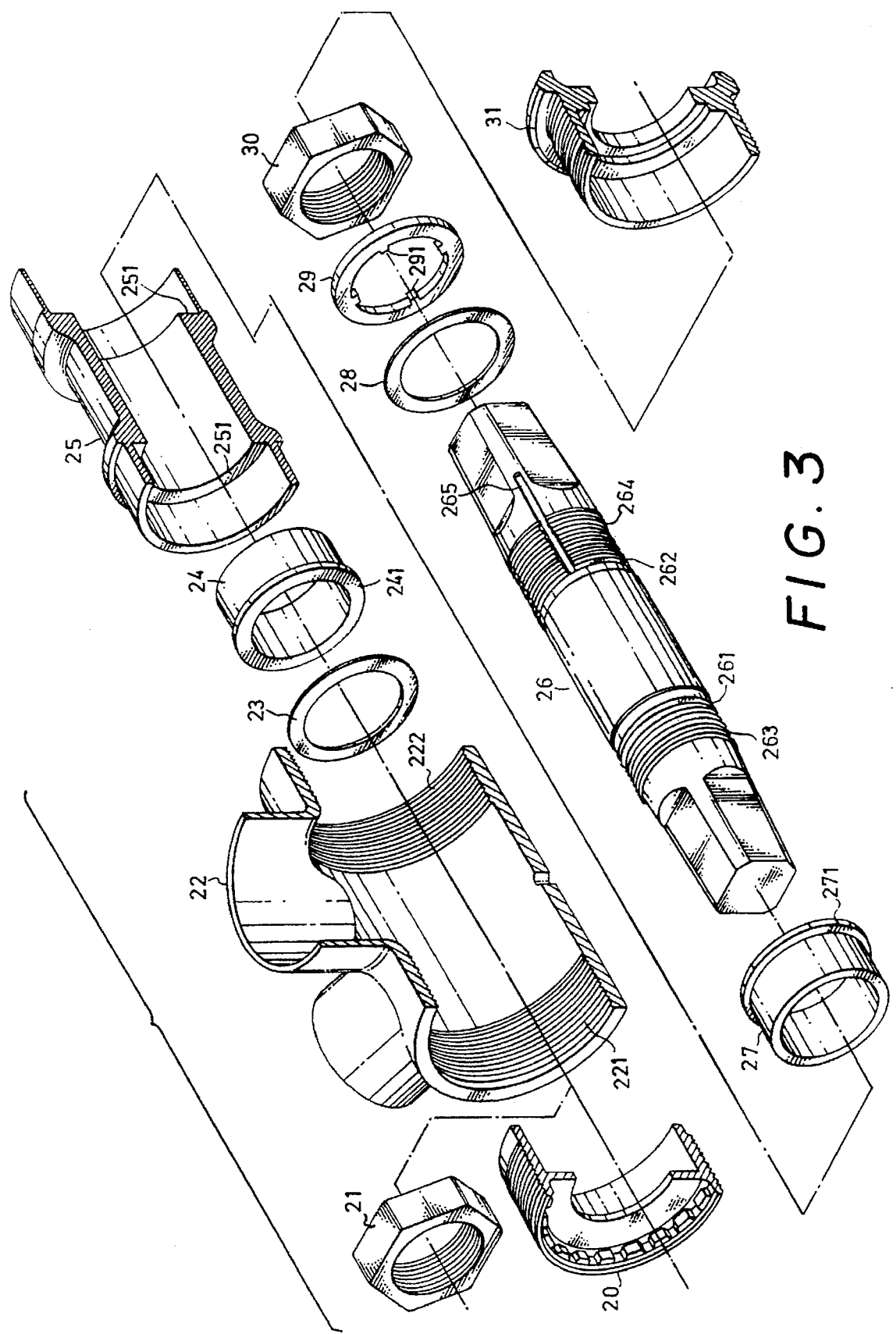
FIG. 3 is an exploded view of a bicycle bottom bracket and bearing axle arrangment according to the present invention.
Figure 4:
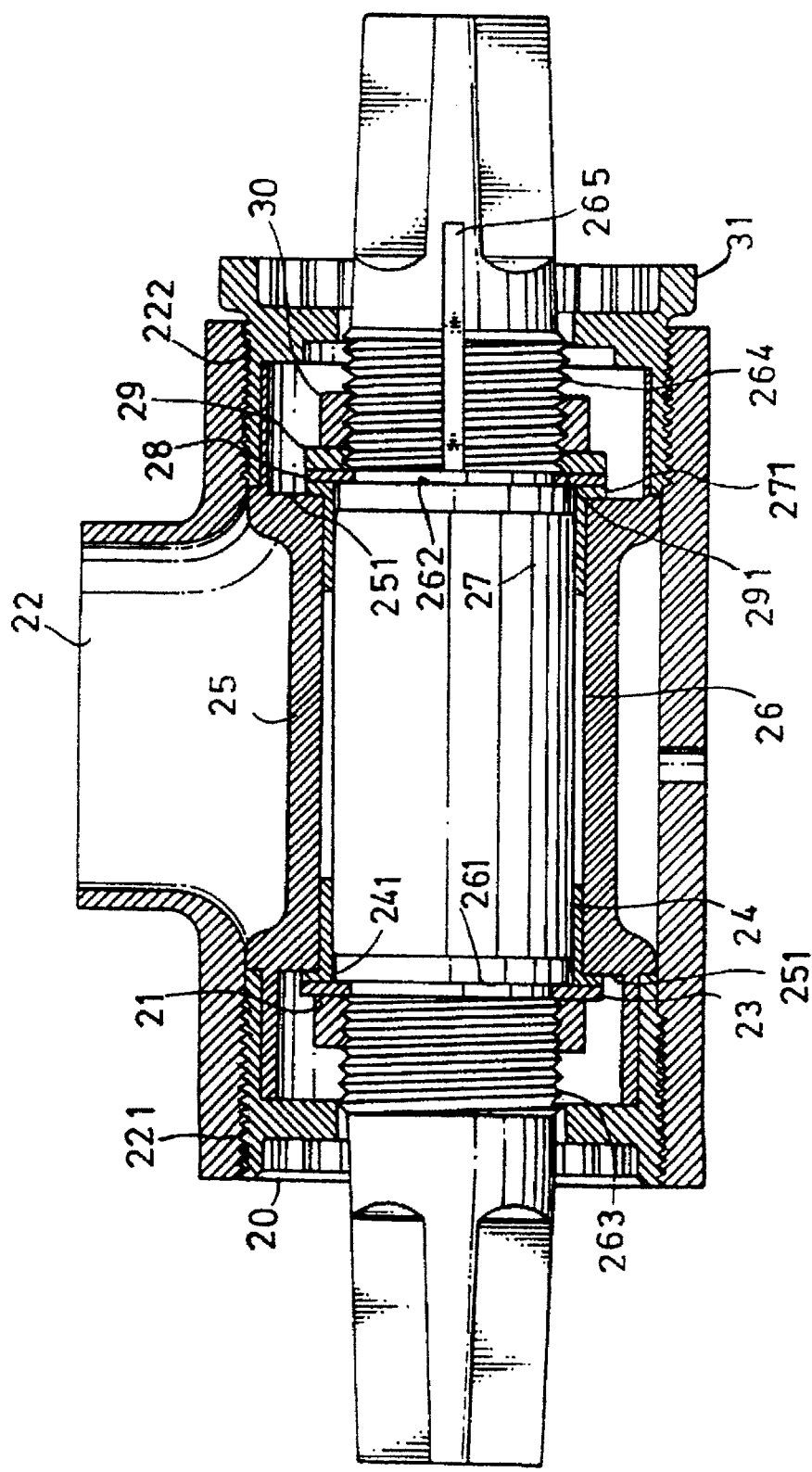
FIG. 4 is a sectional assembly view of the bicycle bottom bracket and bearing axle arrangement shown in FIG. 3.

Referring to FIGS. 3 and 4, the bicycle bottom bracket and bearing axle arrangment in accordance with the present invention is generally comprised of an externally threaded left end cap 20, a left nut 21, a bottom bracket 22, a left locating clamp 23, a left axle bearing 24 a bushing 25, a bottom bracket bearing axle 26, a right axle bearing 27, a right locating clamp 28, a cushion 29, a right nut 30, and an externally threaded right end cap 31. The bottom bracket 22 has two inner threads 221, 222 at two opposite sides. The left end cap 20 and the right end cap 31 are respectively threaded into the inner threads 221, 222 of the bottom bracket 22 to hold the bushing 25 inside the bottom bracket 22. The bushing 25 has an inside annular flange 251. The bearing axle 26 is inserted through the right end cap 31, the bushing 25, and the left end cap 20, comprising two annular grooves 261, 262 made around the periphery and spaced in the middle, two outer threads 263, 264 disposed at two opposite sides relative to the annular grooves 261, 262, and four longitudinal sliding grooves 265 equiangularly spaced around the periphery near one end (the right end). The left axle baring 24 is mounted in one end of the bushing 25 and stopped at one end of the inside annular flange 251 of the bushing 25, having an outward flange 241 stopped outside the bushing 25. The right axle bearing 27 is mounted in the opposite end of the bushing 25 and stopped at the opposite end of the inside annular flange 251 of the bushing 25, having an outward flange 271 stopped outside the bushing 25. When the left axle bearing 24 and the right axle bearing 27 are friction resistance, and respectively made from oil modified resin. When the left axle bearing 24 and the right axle bearing 27 are installed, the inner diameters of the left axle bearing 24, the right axle bearing 27, and the inside annular flangle 251 of the bushing 25 are disposed in flush with one another to support the revolution of the bearing axle 26 smoothly. The left locating clamp 23 and the right locating clamp 28 are respectively fastened to the annular grooves 261, 262 of the bearing axle 26 to hold the left axle bearing 24 and the right axle bearing 27 in the bushing 25. The left nut 21 and the right nut 30 are respectively threaded onto the outer threaded 263, 264 of the bearing axle 26 to hold the left locating clamp 28 and the right locating clamp 28 in place. The cushion 29 is mounted around the bearing axle 26 and retained between the right locating clamp 28 and the right nut 30, having four inward teeth 291 respectively engaging the longitudinal sliding grooves 265 of the bearing axle 26.

What is claimed is:

1. A bicycle bottom racket and bearing axle arrangement comprised of an externally threaded left end cap, a left nut, a bottom bracket, a left locating clamp, a left axle bearing, a bushing, a bottom bracket bearing axle, a right axle bearing, a right locating clamp, a cushion, a right nut, and an externally threaded right end cap, said bottom bracket having two inner threads at two opposite sides, said left end cap and said right end cap being respectively threaded into the inner threads of said bottom bracket to hold said bushing inside said bottom bracket, said bushing having an inside annular flange, wherein:

said bearing axle is inserted through said right end cap, said bushing, and said left end cap, comprising two outer threads near two opposite ends, two annular grooves made around the periphery and space within the outer threads of said bearing axle, and four longitudinal sliding grooves equiangularly spaced around the periphery near one end;

said left axle bearing and said right axle bearing are respectively made from oil modified resin and mounted around said bearing axle in two opposite ends of said bushing and respectively stopped at two opposite ends of the inside annular flange of said bushing, having a respective outward flange respectively stopped outside two opposite ends of said bushing;

said left locating clamp and said right locating clamp are respectively fastened to the annular grooves of said bearing axle to hold said left axle bearing and said right axle bearing in place;

said cushion is mounted around said bearing axle and retained between said right locating clamp and said right nut, having four inward teeth respectively engaging the longitudinal sliding grooves of said bearing axle.

* * * * *